350-360 SR
XR 3,214,272
CROSS REFERENCE SEARCH ROOM

METHOD OF RECORDING STILL OPTICAL IMAGES BY MEANS OF A PHOTOCONDUCTIVE LAYER USING THERMOPLASTIC IMAGEWISE DEFORMATION OF THE IMAGE LAYER

Filed May 9, 1961 3 Sheets-Sheet 1

3214272
OR IN 96/1.1

3,214,272
Patented Oct. 26, 1965

3,214,272

METHOD OF RECORDING STILL OPTICAL IMAGES BY MEANS OF A PHOTOCONDUCTIVE LAYER USING THERMOPLASTIC IMAGEWISE DEFORMATION OF THE IMAGE LAYER

Martin Ploke, Preetz, Holstein, Germany, assignor to Zeiss Ikon Aktiengesellschaft, Stuttgart, Germany Filed May 9, 1961, Ser. No. 108,815
Claims priority, application Germany, May 10, 1960, Z 7,986
17 Claims. (Cl. 96—1)

The invention relates to picture recording and particularly to a method of recording pictures by means of a photoconductive layer which a short time after its exposure produces an optically exploitable picture.

In accordance with an important object of the invention, the method can be performed by a camera of conventional construction which, however, is equipped with certain additional parts as will be described hereinafter. In the same manner as in ordinary photography the picture recording means may consist of a carrier, such as a plate, a foil, a tape, a film strip or a paper strip, in which, however, the picture producing means thereon, which usually consists of a silver bromide layer, is substituted by two transparent layers, namely a transparent conductive layer consisting for example of tin oxide which is covered by a highly insulating layer made, for example, of a polystyrol.

The picture recording method of the present invention requires the following individual steps:

A contacting engagement of the recording means with a photoconductor which latter is arranged upon a conductive base, applying a direct voltage to the two conductive layers, namely to the photoconductor and to the recording means, exposure of the photoconductive layer, and removing of the recording means from the photoconductor. In view of the dielectric after effect, such as a local discharge after a previous charge, there is formed upon the recording means a charge image which corresponds to the optical picture. Immediately thereafter the charge image is converted within the camera into an optically exploitable picture. This may be done by one of the known methods of xerography and electrography. Also suitable would be a thermoplastic recording method. For the application of this method which has become known for producing television pictures by means of an electron beam, there is used for the highly insulating layer of the recording means a thermoplastic material. When the charge image is recorded on this material, a deformation of its surface takes place after a short heating period in dependence of the recorded charge. This causes a conversion of the charge image into an image which may be made visible in the path of an optical beam in a well known manner old in the art. Suitably, the optical means for observing this image are built into the camera.

Next to xerography such electrophotographic methods are also suitable which depend upon a change in the absorption of an electric current. For instance, certain materials used for picture telegraphy, such as iodide compositions, potassium permanganate, etc., exhibit characteristic changes in color when an electric current passes through the same. In the recording method of the present invention these materials are mixed together with the material forming the highly insulating layer. The reaction may, for instance, be released by application of heat which causes during a charge equalization a change in color within the layer.

For the purpose of recording television images there has been proposed heretofore a method in which an insulating tape is caused to come into contact with a photoconductive layer arranged upon a conductive roller, and in which said insulating layer is then scanned by a cathode ray tube line after line. Over this known method and the ones employed in the xerography the recording method of the present application is distinguished by the use of the mentioned special recording method and the employment of a special recording means. Not only for the special case of thermoplastic recording, but in general it is a fact that only when employing a recording means with a thin insulating layer upon a conductive layer there is produced a very high resolving power of the reproduced image which comes very close to an image produced by photography. Another distinguishing feature of the invention is the problem to be solved, namely that an optical image projected by a lens system upon a photoconductive layer is employed as a charge image which in its entirety is transmitted to the recording means. A picture recording by means of scanning lines as suggested by Schröter results in a substantially reduced sensitivity as when the picture is transmitted as a whole. The known methods of xerography lack the feature of the charge transmission from the photoconductor to the recording means.

The invention will now be described in more detail in the following description which refers to the accompanying drawings, in which.

Figure 3A:
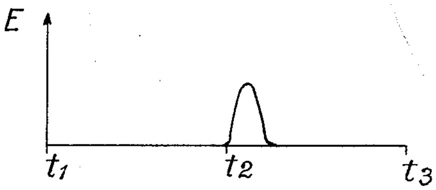
Figure 3B:
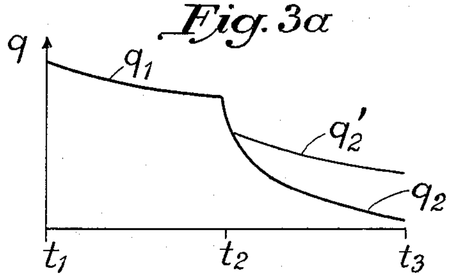
Figures 2, 4A:
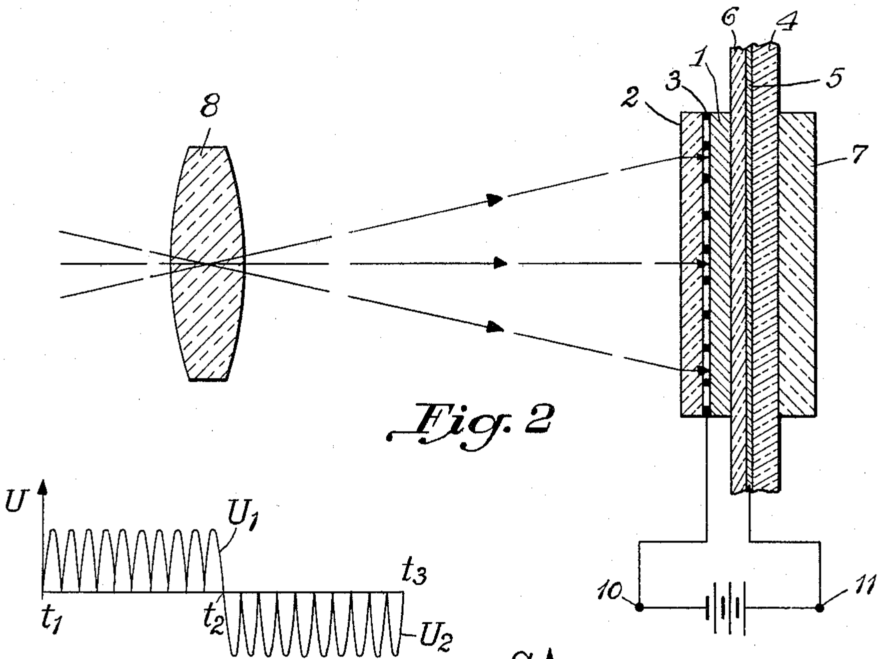
FIG. 2 illustrates the operative position of these individual elements when they are pressed together and are illuminated by a photographic objective.
Figure 4B:
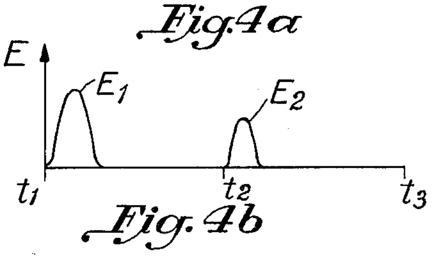
Figure 4C:
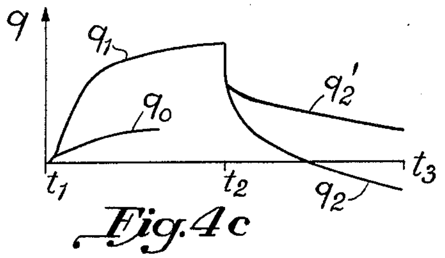
Figure 6:
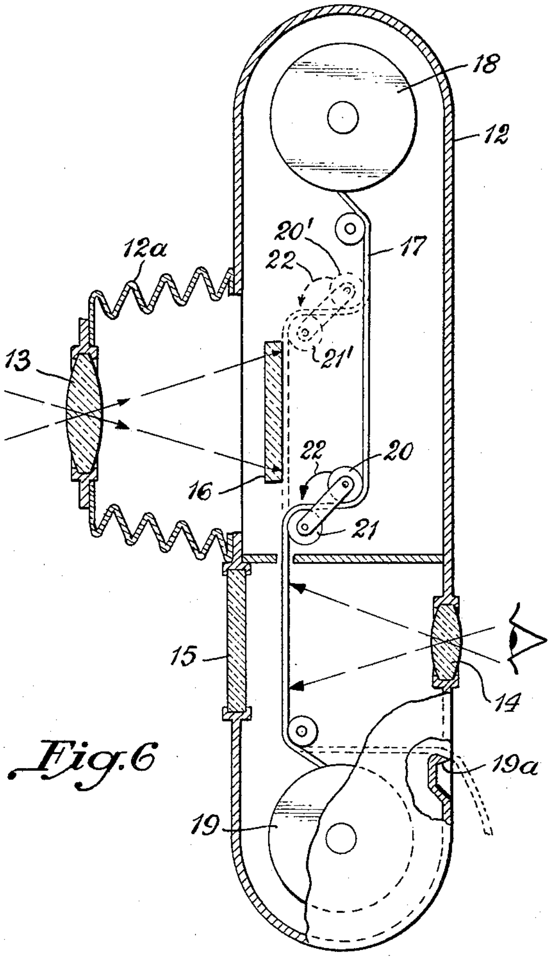
Figure 7:
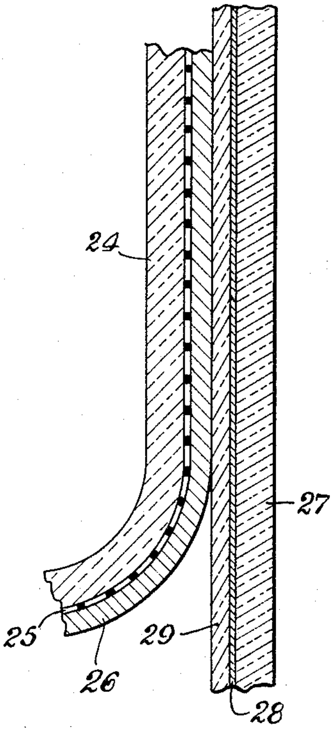
Figure 5A:
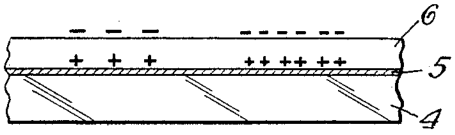
Figure 5B:
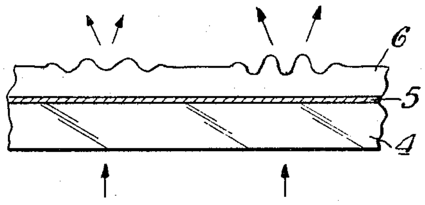
Figure 5C:
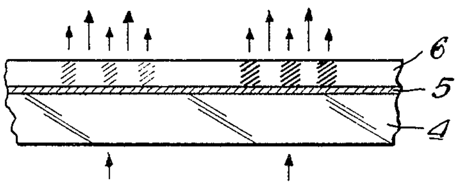
Figure 8:
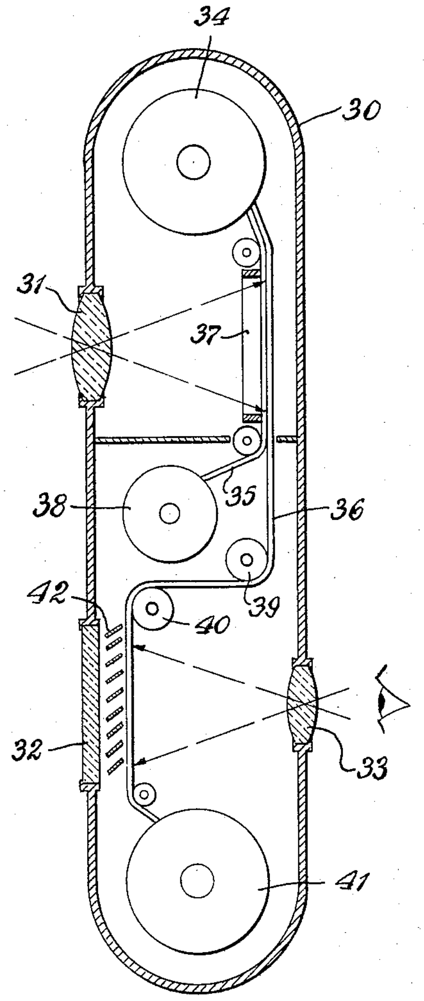
Figure 9:
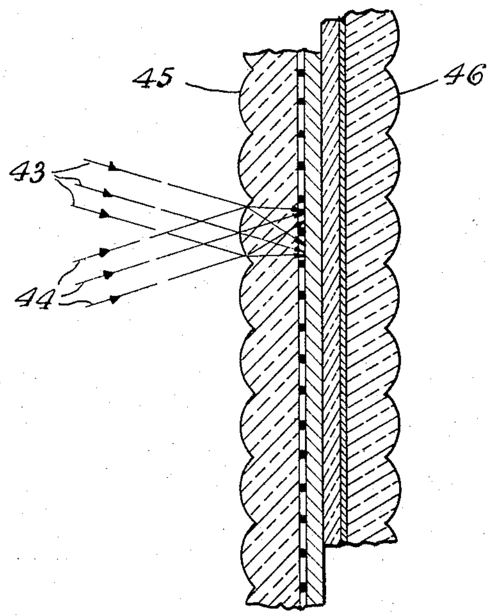

FIG. 3*a* is a diagram illustrating one manner of producing a charge image;

FIG. 3*b* is a diagram illustrating the characteristic of the charge when producing an image according to FIG. 3*a*;

FIG. 4*a* is a diagram illustrating another manner of producing a charge image;

FIG. 4*b* is a diagram illustrating the characteristic of the illumination intensity of the method illustrated in FIG. 4*a*;

FIG. 4*c* is a diagram illustrating the characteristic of the charges when employing the method of FIG. 4*a*;

FIG. 5*a* illustrates one form of recording a picture;

FIG. 5*b* illustrates another form of recording a picture;

FIG. 5*c* illustrates still another form of recording a picture in accordance with the invention;

FIG. 6 illustrates diagrammatically one embodiment of a roll film camera adapted to produce pictures in accordance with the method of the invention;

FIG. 7 illustrates in a sectional view a portion of a double film for producing a picture in accordance with the invention;

FIG. 8 illustrates diagrammatically another embodiment of a roll film camera which employs the double film as illustrated in FIG. 7; and FIG. 9 illustrates in a sectional view a portion of a film for producing multicolored pictures in accordance with the method of the invention.

Figure 1:
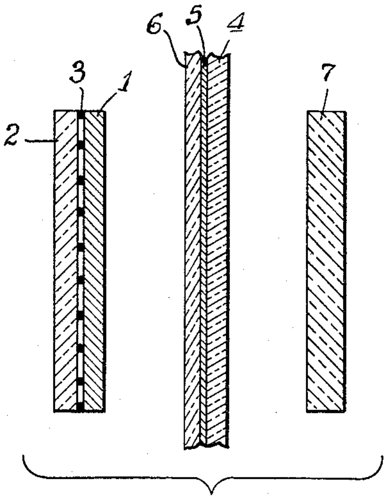
FIG. 1 illustrates diagrammatically the individual elements of the picture producing means, namely the photoconductor, the recording means and a pressing plate in spaced serial arrangement.

Referring to FIG. 1, the same illustrates diagrammatically in side elevation view the three principal elements of the invention, namely the recording means, the photoconductor and a pressing plate used for pressing the recording means into intimate engagement with the photoconductor. The three individual elements just described consist more specifically of a photoconductive layer 1 which on one face is provided with a conductive grid-like intermediate layer 3 which is engaged by a glass base 2. The arrangement is such that the mentioned grid-like screen layer 3 is arranged between the glass plate 2 and the photoconductive layer 1. The recording means consist of a transparent film or carrier 4 which on one side has attached thereto a transparent conductive layer 5 and the latter in turn has applied on its outer face a highly insulating layer which in the following is designated with image layer 6. A plane plate 7 consisting preferably of glass is designated with pressing plate 7 because it is used for pressing the recording means against the photoconductive layer 1. In FIG. 1 the mentioned individual elements of the invention are illustrated in a serially spaced parallel relationship, while in FIG. 2 these individual elements are illustrated in the operative position in which they are all pressed together and in which a photographic lens 8 is shown which projects an image of the pictorial scene to be photographed upon the photoconductive layer 1. The photographic image projected by the lens 8 is, however, dissected as will be explained presently, by the grid-like screen layer 3 before it reaches the photoconductive layer 1.

The grid-like screen structure of the layer 3 has the result that the photographic image is projected upon the photoconductive layer 1 in the form of a great number of discrete image points. This subdivision of the photographic image is necessary when in accordance with the invention a charge image is to be converted into a photographic picture. Only a subdivided light exposure causes a uniformly luminous surface to appear as a luminous surface in the photographic ray path. Within the grid-like screen layer 3 the reproduced picture would only appear in the form of a surface frame. The grid-like subdivided light has also the advantage that within the photoconductive layer tunnel-like zones of increased conductivity are produced which counteract, particularly when a small aperture of the lens system is used, a widening of the picture points in view of the predetermined thickness of the layer of the photoconductor. In connection with a xerographic picture reproduction this subdivision of the light caused by the grid-like screen layer 3 effects an improvement of the half-tone reproduction of the picture.

In FIG. 2 are also shown two contact terminals 10 and 11 which are connected with the conductive layers 3 and 5 respectively. These terminals are also connected by way of example with a direct current battery 9. In order to record upon the image layer 6 a charge image which corresponds to the light image produced by the lens 8 it is possible to employ two methods.

The first method requires that the image layer 6 prior to being brought into contact with the layer 1 is provided with an electric charge which for instance is provided by a corona discharge or by contact with a direct current electrode. After the image layer 6 has come into contact with the photoconductive layer 1, it will be discharged locally with different amounts when the photoconductive layer 1 is exposed by the lens 8. During the discharge the terminals 10 and 11 may be short-circuited or one may also employ a voltage of such polarity that the discharge step is supported thereby. The time period of this operation is illustrated diagrammatically in the FIGS. 3*a* and 3*b*. FIG. 3*a* indicates the illumination intensity E on the photoconductive layer 1, and FIG. 3*b* indicates the charge density $q$ on the image layer 6. At the instant $t_1$ the layer is charged to its density $q_1$, and at the instant $t_2$ the engagement of the layers takes place and at the same time the exposure. At the instant $t_3$ the separation of the recording means from the photoconductive layer 1 takes place. After the engagement of the layers the charge density drops as a result of the transmission of the charge to the photoconductor and then continues along an exposed picture point according to the curve $q_2$. At a non-exposed point, which is almost completely insulated, of the photoconductive layer the charge drops gradually according to the characteristic $q_2'$. After the separation from the photoconductor there remain according to the exposure which took place differently large residue charges on the image layer which in their entirety constitute the charge image.

The second method which may be used is characterized in this, that the image layer 6 is charged only during its contacting engagement with the photoconductive layer 1. For this purpose there may be applied to the terminals 10 and 11 the battery voltage 9 and at the same time the exposure takes place. Greater differences in the charge may be obtained, however, when one employs the steps diagrammatically illustrated in the FIGS. 4*a*, 4*b* and 4*c*. According to this method, the image layer is first uniformly charged by a charge which passes through the photoconductive layer 1 by applying to the terminals 10 and 11 a pulsating direct voltage, whereby, if desired, the layer is caused to be pre-exposed. A pulsating direct voltage has the advantage over a static voltage that a stronger dielectric remanence respectively a greater polarizing charge is obtained.

FIG. 4*a* indicates that the applied voltage $U_1$ at the instant $t_2$, where the picture projection starts, will be reversed in its polarity. $U_2$ then indicates the voltage characteristic during the exposure period. FIG. 4*b* indicates the characteristic of the illumination intensity. The characteristic $E_1$ assumes a uniform pre-exposure of the photoconductor for increasing the charge, while the characteristic $E_2$ indicates the illumination intensity during the exposure caused by the light of the picture to be recorded. FIG 4*c* indicates the characteristic of the charge density in relation to time. Without additional exposure the charge density would increase as shown by the characteristic $q_0$, but with additional light it would increase as shown by the characteristic $q_1$. After reversing the polarity of the voltage, the charge density first drops and then has the characteristic $q_2$ at a bright picture point, while at a dark picture point the characteristic is indicated by $q_2'$. At the instant $t_3$ the image layer is separated from the photoconductor. It is of importance that the separation takes place some time after the exposure has taken place and that the voltage remains applied during this period so that any inertia effects of the photoconductor may be exploited for amplifying the charge image. The reversing of the polarity of the applied voltage has the advantage that during the exposure the double field strength acts on the image layer compared with a single field strength which would be applied without this additional step. This feature also increases the sensitivity.

The amount of the residual charge depends upon the capacity of the image layer compared with the capacity of the photoconductive layer. It should be attempted to furnish the image layer with a greater capacity. When the dielectric constants of both said layers are substantially alike, then it is suggested to make the thickness of the photoconductive layer 1 substantially thicker than the thickness of the image layer 6. It is old in the art to form the various layers of the elements of thin material suitable to the conditions in which they are used as set forth in Patent 2,277,013 issued to C. F. Carlson, June 17, 1942.

According to another object of the invention, the storage capacity of the image layer may be increased substantially when it consists of a ferro-electric substance or when this layer has been mixed with ferro-electric substances. To this group of materials belong for instance Seignette salt, barium titanate and certain phosphates. The dielectric constants of these materials vary between 300 and 3000 and therefore exceed the dielectric constants of conventional photoconductors, such as selenium or antimony trisulphide, by as much as 50 to 500 times. In view of their greater dielectric constants these materials store not only a greater amount of the charge than other insulating materials, but they also have the appearance of dielectric remanence which corresponds to permanent magnetism.

In order that the image layer remains substantially transparent in spite of these additional ingredients, the invention proposes to imbed these ingredients within a highly insulating transparent artificial material having approximately the same covering index, whereby this material may be provided with an additional breath-thin layer of this artificial material without any additional ingredients. Also so-called electrets may be used as material for the highly insulating layer 6. These electrets represent such particulate materials which assume a permanent polarization if heated while under the influence of an electric field and are then cooled.

The charge images produced by any one of these two methods may be converted immediately into a visible picture or the charge image may also be stored for some time, provided that the image layer during the storage is covered with a high quality insulating material which prevents a dissipation of the charge. For this reason the invention proposes to provide the rear surface of the recording means also with a highly insulating layer and then the entire strip with the recording charge images thereon is spirally wound upon a spool in the manner of a conventional rollfilm. Preferably, however, the charge image is converted immediately after its recording into a visible picture. For illustrating the result of such a picture conversion, reference is now being made to the FIGS. *5a*, *5b* and *5c* which illustrate a sectional view of the picture recording means. There are illustrated three different forms of picture recording. FIG. *5a* illustrates the charge image, FIG. *5b* illustrates an image having a succession of recesses for viewing in the manner photographic pictures are viewed and which ghost image was produced according to the method of thermoplastic picture recording, and FIG. *5c* illustrates diagrammatically an absorption picture which is produced according to a xerographical or electrographical method. The individual layers have the same designations as used in the FIGS. 1 and 2.

FIG. 6 illustrates diagrammatically the mechanical and optical construction of a roll film camera in accordance with the present invention. This rollfilm camera is provided with a camera casing 12, and a photographic objective 13 is mounted at the outer end of a conventional bellows 12*a*. The camera is equipped with a conventional view finder (not illustrated) and in addition thereto is provided with an enlarging lens 14 for viewing the reproduced picture which is illuminated by a ground glass plate 15. In the focal plane of the photographic objective 13 is arranged a glass plate 16 having thereon the grid-like screen conductive layer 3 and the photoconductive layer 1 which latter faces the film in the camera. The transparent picture recording means 17 extends in the form of a film strip between a supply spool 18 and a take-up spool 19. The recording means 17 is engaged between these two spools by two rollers 20 and 21 which are connected with one another and which are so arranged that they face the image layer and the photoconductor. The two rollers 20 and 21 permit a non-slip drive of the film strip along the glass plate 16 with the photoconductor thereon. When the rollers 20 and 21 have been adjusted to the position indicated in the dotted lines 20' and 21', then the film strip has been brought into contacting engagement with the photoconductor. Preferably, in this position the film strip is pressed by spring action against the plate 16 and is kept under tension. After the exposure has been completed, which as described in the foregoing results in the production of a charge image, the rollers 20 and 21 are returned to the position shown in full lines in FIG. 6. It should be noted that the roller 20 engages only the marginal portion of the film strip to prevent the dissipation of the recorded charges, while on the other hand the roller 21 engages with its entire width the entire film strip. The rollers 20, 21 may be provided with an electrode 22 which serves for spraying electric charges on the film strip by means of a corona discharge, provided the image layer is to be charged before coming into contacting engagement with the conductive layer. After the exposure and the charging steps have been completed, the film is advanced so that the charge image moves in front of the ground glass plate 15. In this position the charge image is converted into a photographic picture. This conversion can be observed by the enlarging lens 14. All manipulations are suitably coupled with the film advancing mechanism.

For the removal of the pictures a cutting device 19*a* may be provided. FIG. 6 does not show all of the auxiliary elements, such as contact rails for the film strip. These contact rails may, for instance, be arranged on both sides of the ground glass plate 15. When the film strip is suitably shaped, the contacting engagement may also take place transversely to the film strip at a point between two adjacent pictures. It is also of advantage to omit the conductive layer between two successive pictures. This feature is then indicated when it is the intention to subject the conductive layer to Joule's heat so that the heating is restricted to the individual picture just being converted.

FIG. 7 shows a modification of the structure of the film strip in which the photoconductive layer is not arranged on a stationary base, but in the same manner as the recording means is arranged on a flexible film. This arrangement has the advantage that the contacting engagement between the photoconductor and the recording means is always present before the exposure takes place. In this manner certain adjusting and contacting difficulties are eliminated. Furthermore, there exists the possibility for charging the image layer prior to its storing in the supply spool. In FIG. 7 the transparent base of the photoconductive layer 26 is designated with 24. Between the layers 24 and 26 is arranged the conductive grid-like layer 25. The film base of the recording means is designated with 27 and the latter has applied thereto the transparent conductive layer 28, and the image layer 29 is arranged on the layer 28. If the image layer 29 upon which the charge image is recorded is intended to be separated from the film 24 with the layers 25 and 26, this separation is accomplished after the charge image has been produced on the layer 29.

When the photoconductor consists of a material which in darkness is highly insulating, then a double film strip as shown in FIG. 7 has the additional advantage that the charge image prior to being converted into an optically exploitable picture may be stored a longer period of time without danger that the charge image will be dissipated on account of exterior conditions. The double film strip may then be removed from the camera in the same manner as any other photographic film. It has thereon latent charge images which may be converted at a later time into a visible picture or may be exploited by an electronic scanning method.

A photographic camera which is particularly suitable for using the just described double film strip is diagrammatically illustrated in FIG. 8. This camera is provided with a camera casing 30, a photographic objective 31 and a ground glass plate 32 for illuminating the picture which is observed through an enlarging lens 33. The supply spool 34 has wound thereon the film strip 35 in intimate contact with the film strip 36. Both these film strips are exposed as any ordinary photographic film to the light passing through the camera objective 31. At the lower edge of the picture window 37 the photoconductive film strip 35 will be withdrawn from the recording film strip 36 and is wound upon a take-up spool 38. The recording film strip 36 with the charge image thereon is passed over guide rollers 39 and 40 and after the charge image is converted into a visible picture, it is wound upon the take-up spool 41. If, however, the charge image is to be converted into a visible picture outside the camera, then the double film strip is not separated, but both film strips 35 and 36 are wound upon the take-up spool 41. FIG. 8 shows another modification, namely a bar grid 42 which is arranged in rear of the ground glass plate 32 and which serves for viewing the photographic picture by means of the enlarging lens 33 when it is dark. The bars of the grid 42 are inclined with reference to the viewing rays in such a manner that the eye of the observer does not receive direct light but only that light which was reflected by the picture.

The picture recording method of the present invention is also suitable for the production of multicolored photographic pictures by employing the lens screen method. If a double layer film as illustrated in FIG. 7 is used for the recording of the picture, it would be possible to provide this double layer film 24 to 29 with congruent lens screens 41 and 42, respectively, on the outermost faces of the layers 24 and 27, respectively. It is known that the impression of colors is produced in the lens screen method in that the light rays entering from various directions correspond to multicolor filters which portray the primary colors. As indicated, the light rays coming for instance from the direction 43 correspond to a green image while the light rays coming from the direction 44 correspond to a red image. The red image and the green image, respectively, will become effective on different points of the photoconductive layer and in this position will be transferred to the image layer in the form of adjacent charge image elements. During the conversion of these charge images into photographic pictures one proceeds in the same manner as in the recording of these multicolored pictures in that the light rays which pass through the lens screen in different directions are colored by different filters.

It is a further object of the invention when recording multicolored pictures to provide solely the recording means with a lens screen and to expose the photoconductive layer through this recording means. In this manner any difficulties which may arise owing to a lack of coordination between the picture elements and the lens screen are eliminated.

As the material for the photo-conductive layer cadmium-sulphide, selenium, antimontrisulphide, antimontrioxide, cadmium-selenide or zinc oxide may be chosen.

What I claim is:

1. In a method of recording still optical pictures upon a recording means comprising a plate or a film strip having thereon an electrically energizable transparent conductive layer (5) which latter is covered by a highly insulating image layer (6) having a high dielectric constant, the steps of bringing said last named layer (6) into contact with one side of a photoconductive layer (1) provided on its other side with a conductive screen (3) which covers the entire side of said photoconductive layer and provide an electrode for supplying current to said photoconductive layer, exposing said photoconductive layer (1) through said screen (3) thereon to the pictorial scene to be photographically recorded, thereby producing on said photoconductive layer a great number of discrete image points, applying an electric potential by means of a direct electrical connection to said screen and said transparent conductive layer (5) for recording upon said image layer (6) different electrical quantities in accordance with the content of the image of said pictorial scene, separating said recording means from said photoconductive layer, and then heating said image layer above its softening point whereby said layer is deformed, in accordance with the said discrete image points, into a visible picture.

2. A method according to claim 1, in which transparent material is used for the highly insulating layer on said picture recording means and for said photoconductive layer.

3. A method according to claim 1, in which transparent material is used for the highly insulating layer on said picture recording means and for said photoconductive layer, while the carrier for said photoconductive layer is formed of a light transmitting conductive grid structure.

4. A method according to claim 1, in which said highly insulating layer covers said conductive layer over its entire area except for a marginal portion for permitting said conductive layer to be connected to a source of current which heats said conductive layer.

5. A method according to claim 1, in which said highly insulating layer contains ferroelectrical additions, such as Seignette salt or barium titanate.

6. A method according to claim 1, in which said highly insulating layer contains additions of electrical particulate material.

7. A method according to claim 5, in which the base material of said highly insulating layer has approximately the same index of refraction as said additions.

8. A method according to claim 5, in which said additions are only contained in the interior of said highly insulating layer, while the outer surfaces are comparatively free of said additions.

9. A method according to claim 1, in which said conductive layer is heated during the image conversion by connecting an electric current source to said conductive layer in which said conductive layer is heated during the image conversion by the passage of a direct current therethrough.

10. A method according to claim 1, in which the highly insulating layer of said recording means is subjected to a charging operation produced by a corona discharge before it is brought into contacting engagement with said photoconductive layer.

11. A method according to claim 1, in which a static direct voltage is applied to the conductive layer and the photoconductive layer during and after the exposure of the same to the light coming from the pictorial scene to be photographed.

12. A method according to claim 1, in which a pulsating direct voltage is applied to the conductive layer and the photoconductive layer during and after the exposure of the same to the light coming from the pictorial scene to be photographed.

13. A method according to claim 1, in which said charge image is converted into said optically exploitable picture by a known method of xerography and electrography.

14. A method according to claim 1, in which the highly insulating layer of said picture recording means consists of a thermoplastic material having a low softening temperature, while as a base a material having a higher temperature strength is selected, so that the charge image may be converted into an image having a succession of recesses by means of short duration heating of the conductive layer.

15. A method according to claim 1, in which the highly insulating layer contains an ingredient which changes its absorption when treated chemically and when the charge equalization between said highly insulating layer and the adjacent conductive layer is effected by an increase in temperature.

16. A method according to claim 1, in which said picture recording means after exploitation of the picture can be restored to its original condition and can be used repeatedly for recording a picture.

17. A method according to claim 1, in which the recorded charge image is conserved for a later conversion into an optically exploitable picture by coating also the rear face of the employed picture recording means with a highly insulating layer, so that the charges on the surface of the recording means are not prematurely lost when the recording means is stacked and rolled, respectively.

References Cited by the Examiner

UNITED STATES PATENTS

| | | | |
|---|---|---|---|
| 2,277,013 | 3/42 | Carlson | 178—5 |
| 2,798,959 | 7/57 | Moncrieff-Yeates | 250—65 |
| 2,808,328 | 10/57 | Jacob | 96—1 |
| 2,825,814 | 3/58 | Walkup | 250—49.5 |
| 2,896,507 | 7/59 | Mast et al. | |
| 2,917,385 | 12/59 | Byrne | 96—1 |
| 2,937,943 | 5/60 | Walkup | 96—1 |
| 2,961,932 | 11/60 | Francis et al. | 95—1.7 |
| 2,982,647 | 5/61 | Carlson et al. | 96—1 |
| 2,984,163 | 5/61 | Giaimo | 95—1.7 |
| 2,985,866 | 5/61 | Norton | 340—173 |
| 2,990,280 | 6/61 | Giaimo | 96—1 |
| 2,993,787 | 7/61 | Sugarman | 96—1 |
| 3,055,006 | 9/62 | Dreyfoos et al. | 346—74 |
| 3,063,872 | 11/62 | Boldebuck | 117—211 |
| 3,095,324 | 6/63 | Cusano et al. | 117—215 |
| 3,108,893 | 10/63 | Oliphant | 117—93.4 |

FOREIGN PATENTS

| | | |
|---|---|---|
| 598,591 | 1/61 | Belgium. |

OTHER REFERENCES

Journal of Applied Physics, 30, No. 12, December (1959), pp. 1870–1875.

NORMAN G. TORCHIN, *Primary Examiner.*

PHILIP E. MANGAN, *Examiner.*